(12) United States Patent
Aloe et al.

(10) Patent No.: US 8,760,510 B2
(45) Date of Patent: Jun. 24, 2014

(54) APPARATUS AND METHODS FOR THREE-DIMENSIONAL IMAGING USING A STATIC LIGHT SCREEN

(75) Inventors: Robert T. Aloe, Ambridge, PA (US); Patrick Flynn, Granger, IN (US)

(73) Assignee: Robert T. Aloe, Ambridge, PA (US)

( * ) Notice: Subject to any disclaimer, the term of this patent is extended or adjusted under 35 U.S.C. 154(b) by 165 days.

(21) Appl. No.: 12/626,067

(22) Filed: Nov. 25, 2009

(65) Prior Publication Data

US 2010/0134600 A1 Jun. 3, 2010

Related U.S. Application Data

(60) Provisional application No. 61/200,272, filed on Nov. 26, 2008.

(51) Int. Cl.
*H04N 7/18* (2006.01)
*H04N 3/02* (2006.01)
*H04N 13/02* (2006.01)

(52) U.S. Cl.
USPC ............ 348/142; 348/48; 348/153; 348/154; 348/195

(58) Field of Classification Search
USPC ........... 348/48, 195, 202, 143, 152, 154, 155, 348/156
See application file for complete search history.

(56) References Cited

U.S. PATENT DOCUMENTS 5,793,491 A * 8/1998 Wangler et al. ............... 356/613
6,320,610 B1 * 11/2001 Van Sant et al. .............. 348/143
6,545,705 B1 * 4/2003 Sigel et al. .................... 348/157
7,583,391 B2 * 9/2009 Lu ................................. 356/601
2003/0067537 A1 * 4/2003 Myers ............................ 348/47
2004/0017929 A1 * 1/2004 Bramblet et al. ............. 382/103
2005/0068165 A1 * 3/2005 Kelliher et al. ............... 340/523

OTHER PUBLICATIONS

P. Saint-Marc, J.L. Jezouin, & G. Medioni, "A Versatile PC-Based Range Finding System", 7 IEEE Trans. opn Robotics & Automation 250-256 (Apr. 1991).*
T. Weise, B. Leibe, & L. van Gool, "Fast 3D Scanning with Automatic Motion Compensation", IEEE 2007 Conf. on Computer Vision & Pattern Recognition 1-8 (Jun. 2007).*

(Continued)

*Primary Examiner* — Dave Czekaj
*Assistant Examiner* — David N Werner
(74) *Attorney, Agent, or Firm* — Arnold, Knobloch & Saunders, L.L.P.; Christopher P. McKeon

(57) ABSTRACT

A three-dimensional imaging apparatus is disclosed. The apparatus includes a generated first planar light screen, and a first and second detector offset from the perpendicular plane of the light screen. The first detector is located on a first side of the perpendicular plane, and the second detector is located on the opposite side of the perpendicular plane. The first and second detectors detect the instantaneous projection of the first planar light screen upon an object within the first planar light screen, and to output first and second data corresponding to the detected projection. A velocity sensor determines the instantaneous velocity of the object as the object moves relative to the first planar light screen, and to output third data corresponding to the determined velocity. A processor acquires the data from the first and second detector, and the velocity sensor at least two instantaneous times as the object moves relative to the first planar light screen and combines the first, second, and third data to create a three-dimensional image of the object.

20 Claims, 9 Drawing Sheets

(56) References Cited

OTHER PUBLICATIONS

S. König & S. Gumhold, "Image-Based Motion Compensation for Structured Light Scanning of Dynamic Surfaces", 5 Int'l J. of Intelligent Sys. Tech. & Apps. 434-441 (Nov. 20, 2008).*

L. Kovacs, A. Zmimmermann, G. Brockmann, M. Gühring, H. Baurecht, N.A. Papadopulos, K. Schwenzer-Zimmerer, R. Sader, E. Biemer, & H.F. Zeilhofer, "Three-dimensional recording of the human face with a 3D laser scanner", 59 J. of Plastic, Reconstructive, & Æsthetic Surgery 1193-1202 (Nov. 2006).*

J. Pagès, J. Salvi, R. Garcia, & C. Matabosch, "Overview of coded light projection techniques for automatic 3D profiling", Proc. of the 2003 IEEE Int'l Conf. on Robotics & Automation 133-138 (Sep. 2003).*

J. J Davis & X. Chen, "Foveated Observation of Shape & Motion", Proc. of the 2003 IEEE Int'l Conf. on Robotics & Automation 1001-1006 (Sep. 2003).*

M. Wand, P. Jenke, Q. Huang, M. Bokeloh, L. Guibas, & A. Schilling, "Reconstruction of Deforming Geometry from Time-Varying Point Clouds", Proc. of the 5th Eurographics Symp. on Geometry Processing 49-58 (2007).*

I. Pavlidis, P. Symosek, B. Fritz, & N. Papanikolopolous, "A Near-Infrared Fusion Scheme for Automatic Detection of Vehicle Passengers", Proc. of the 1999 IEEE Workshop on Comp. Vision Beyond the Visible Spectrum (CVBVS '99) 41-48 (Jun. 1999).*

* cited by examiner

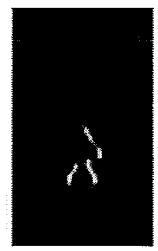  
FIG. 3A  FIG. 3B  FIG. 3C
  
FIG. 3D  FIG. 3E  FIG. 3F
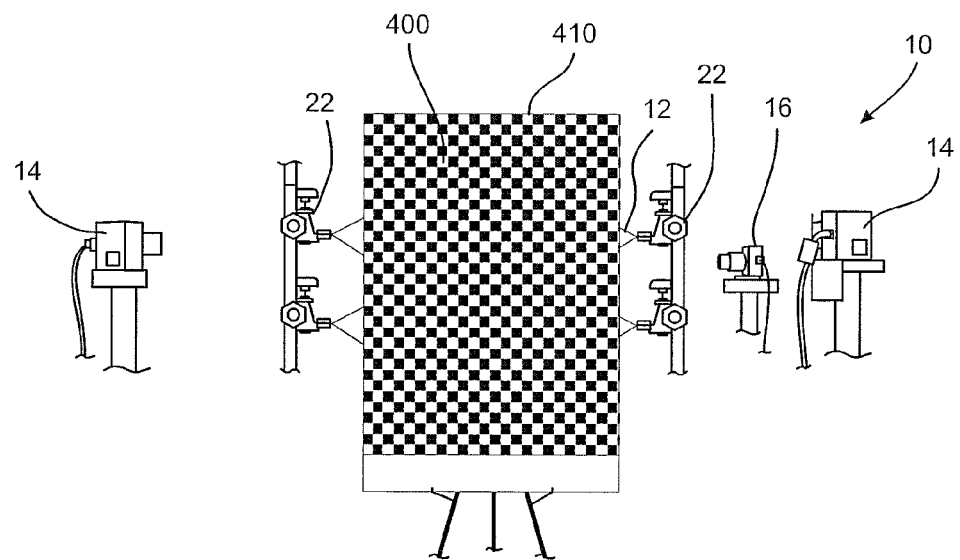
FIG. 4

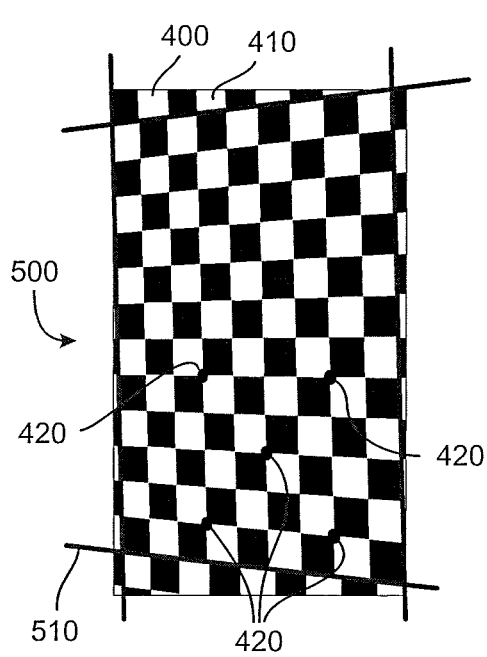
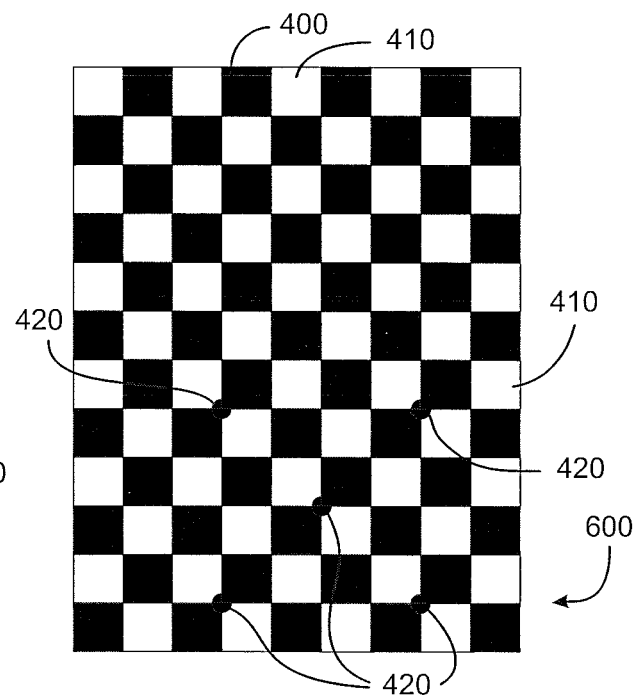
FIG. 5
FIG. 6
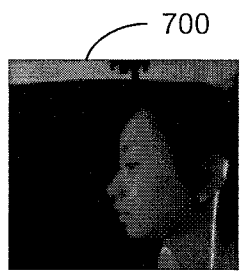
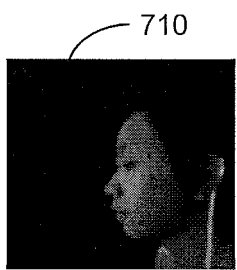
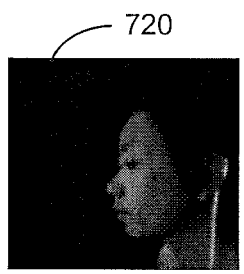
FIG. 7A  FIG. 7B  FIG. 7C
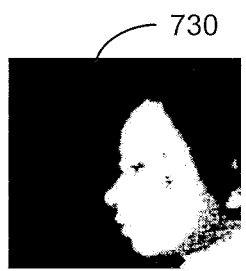
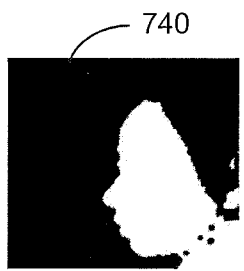
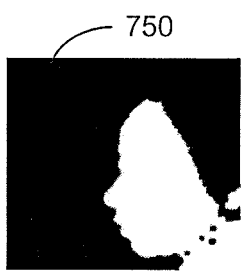
FIG. 7D  FIG. 7E  FIG. 7F

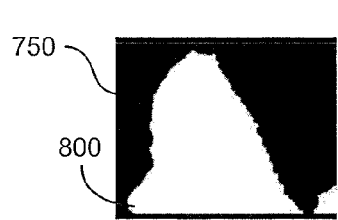 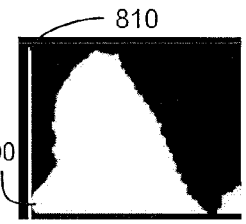 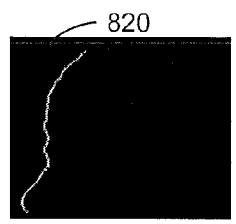
FIG. 8A  FIG. 8B  FIG. 8C
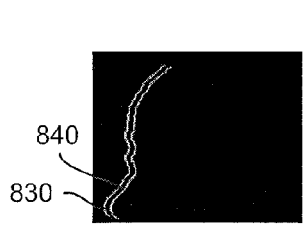 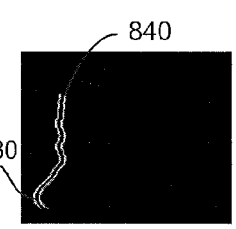 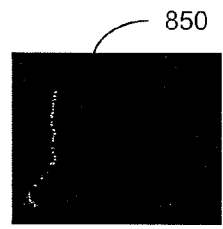
FIG. 8D  FIG. 8E  FIG. 8F
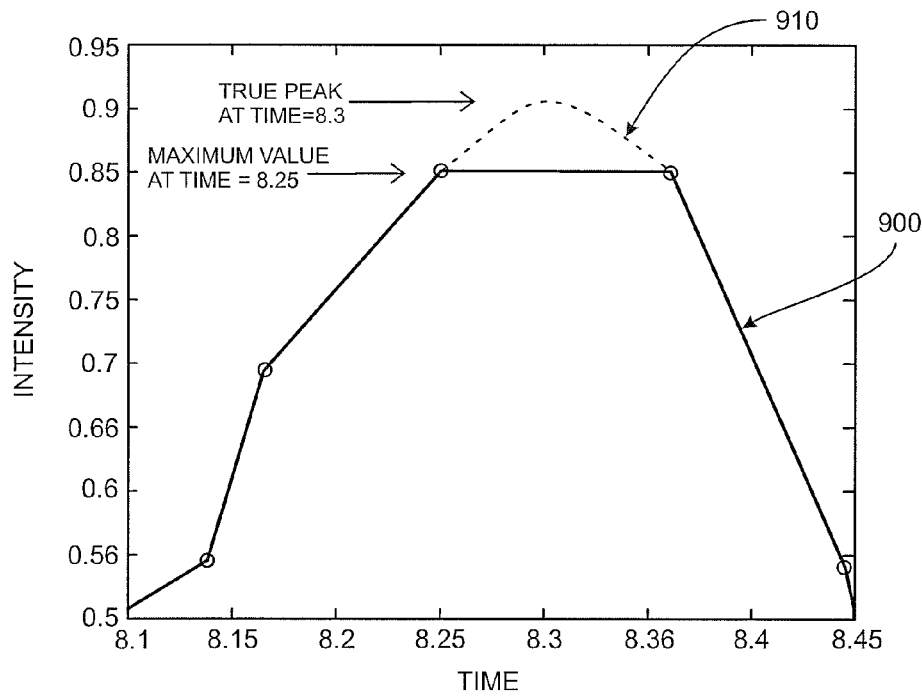
FIG. 9

APPARATUS AND METHODS FOR THREE-DIMENSIONAL IMAGING USING A STATIC LIGHT SCREEN

STATEMENT OF GOVERNMENTAL SUPPORT

At least a portion of the invention disclosed and claimed herein was made in part utilizing funds supplied by the National Science Foundation under Grant No. CNS01-30839, by the Technical Support Working Group under U.S. Army Contract No. W91CRB-08-C-0093, and by the U.S. Dept. of Justice/National Institute for Justice under Grant No. 2006-IJ-CX-K041. The United States Government has certain rights in this invention.

CROSS REFERENCE TO RELATED APPLICATION

This application is a non-provisional application claiming priority from U.S. Provisional Application Ser. No. 61/200,272, filed Nov. 26, 2008, entitled "Static Light Screen Scanner" and incorporated herein by reference in its entirety.

FIELD OF THE DISCLOSURE

The present disclosure relates generally to three-dimensional imaging and more particularly to apparatus and methods for three-dimensional imaging using a static light screen.

BACKGROUND OF RELATED ART

Three-dimensional imaging is increasingly becoming more relevant to security applications, such as, for example, for facial recognition in both the public and private sectors. Three-dimensional facial recognition can exploit the relative insensitivities of three-dimensional facial shape images to facial color variations and facial illumination changes versus traditional two-dimensional images. Triangulation is one method typically used to acquire a three-dimensional image of an object at short range.

Some commercially available three-dimensional image capturing systems employ passive or texture-assisted stereo imaging or structured illumination with a moving light stripe. These techniques, however, require a stationary subject. For example, one traditional method of triangulation uses an active light that translates a line and/or line pattern across an object and recovers the three-dimensional profile at each position based on the deformation of the line in the image. This process requires the calibration of both the line projector and the motion platform. Still another example method utilizes a single camera, a single laser line projector, and a controlled conveyor belt to image objects by assembling a series of two-dimensional profiles obtained by object displacement. This process similarly requires moving parts as well as calibration between movement of the object and the camera.

BRIEF DESCRIPTION OF THE DRAWINGS

FIGS. 3A-3C are examples of the captured image data from the velocity sensor of the example apparatus of FIG. 1.

FIGS. 3D-3F are examples of the captured image data from the side image detector of the example apparatus of FIG. 1.

FIG. 4 illustrates an example grid used to calibrate the example apparatus of FIG. 1.

FIG. 5 is an example image of the calibration grid of FIG. 4, prior to calibration of the example apparatus of FIG. 1.

FIG. 6 is an example image of the calibration grid of FIG. 4, after calibration of the example apparatus of FIG. 1.

FIGS. 7A-7F are examples of side images captured and utilized to calibrate the example apparatus of FIG. 1.

FIGS. 8A-8F illustrates an example calibration of the example apparatus of FIG. 1, utilizing the image of FIG. 7F.

FIG. 9 is a graph illustrating an example temporal domain stripe peak estimation used by the example apparatus of FIG. 1.

DETAILED DESCRIPTION

The following description of the disclosed examples is not intended to limit the scope of the disclosure to the precise form or forms detailed herein. Instead the following description is intended to be illustrative of the principles of the disclosure so that others may follow its teachings.

As described above, one traditional method for triangulation using active light translates a line or pattern across an object, such as, for example, a face of a human subject, and recovers a three-dimensional profile at each position based on the deformation of the line in the image. This process involves the calibration of both the line projector and the motion platform. By contrast, the examples described herein employ a static light screen through which the object moves. In this fashion, a detection device, such as, for example, a camera, sees the deformation of the projected static light screen, yielding a profile. The detected profile images are assembled in a three-dimensional image from multiple images by knowing the deformation of the static light screen and the object's instantaneous velocity. In particular, the example cameras are calibrated for a single, fixed plane of light and rely upon subject motion to provide the multiple stripe positions needed to acquire a three-dimensional image. The example apparatus and methods described herein require no moving parts and are not subject to mechanical failure and/or errors oftentimes associated with other triangulation methods. The apparatus and methods described herein allow a subject to travel (e.g., walk) through the sensor naturally, which is one advantage.

Figure 1:
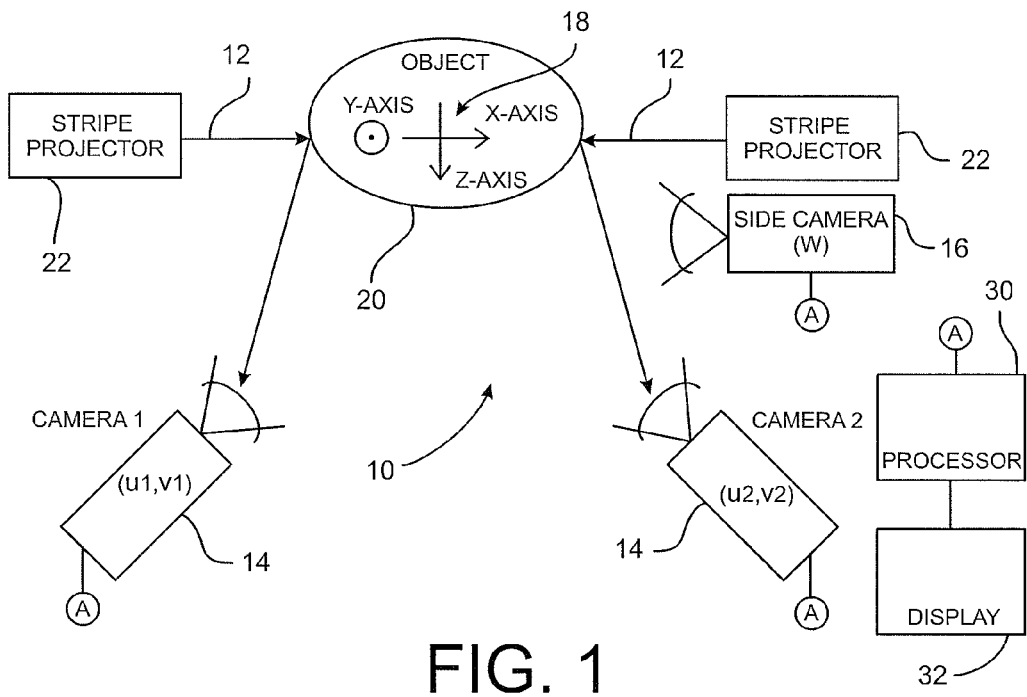
FIG. 1 is a schematic drawing of an example apparatus for three-dimensional imaging of a moving object.

Referring now to FIG. 1, an example apparatus 10 for imaging using a static light screen is schematically illustrated. In particular, the example apparatus 10 includes a light screen 12, at least one detector 14, and a velocity sensor 16. For ease of calculation, the apparatus 10 may be referenced within a three-dimensional Cartesian coordinate system 18. The reference coordinate system, however, may be chosen and adapted from any suitable reference system.

In this example, an x-axis and y-axis are co-planar with the light screen 12, while a z-axis extends perpendicular to the plane of the light screen, in the general direction of travel of any object, such as for example, a human subject 20 moving through the light screen 12 with an instantaneous velocity v. As the subject 20 moves through the light screen 12, the subject 20 is imaged, as described in detail herein.

Figure 2:
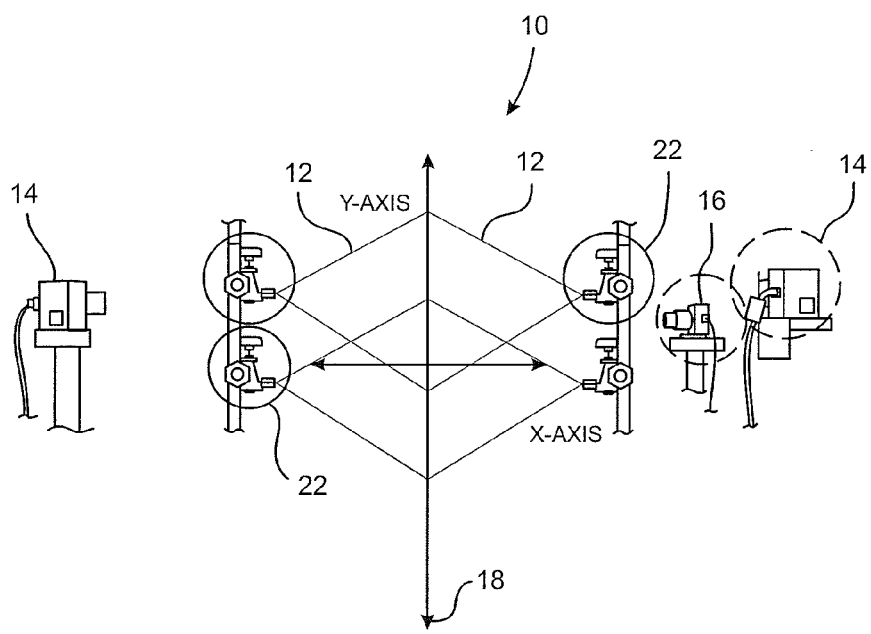
FIG. 2 is an example construction of the example apparatus of FIG. 1.

In the example apparatus 10 illustrated in FIGS. 1 and 2, the light screen 12 is formed using two projectors 22 spaced apart from one another and located on opposite sides of the subject 20. The example projectors 22 used to form the light screen 12 in the apparatus 10 are laser stripe projectors. Each of the projectors 22, however, may be any suitable projector, including, for example, a single light source (e.g., a single light source split into a screen via a beam splitter), a plurality of light sources, and/or any number of projectors capable of creating electromagnetic radiation, such as, for example, light in any suitable wavelength (e.g., visible light, invisible light, etc.), or any other detectable projection. Accordingly, as used herein, a light screen may be any suitable electromagnetic radiation and/or otherwise detectable screen. In this example, the projectors 22 produce a visible laser light (e.g., a visible red laser light) and are aligned such that the opposed projectors 22 create a light screen 12 that is coplanar. Additionally, in this example, the light screen 12 corresponds to the zero axis (e.g. the z=0 plane) of the reference Cartesian coordinate system 18.

The example apparatus 10 includes a pair of detectors 14, located in front of the subject 20, i.e., in the predominant direction of movement of the subject 20, and a velocity sensor 16. In this example, the detectors 14 are each located and offset from either side of a plane extending perpendicular to the plane of the light screen 12. Each of the example detectors 14 is a high-speed light camera capable of detecting the presence of the light screen 12 on the surface of the subject 20 as illustrated in FIGS. 3A-3B. The example velocity sensor 16 is a digital video camera used to track a velocity v of the subject 20 in the z direction of the Cartesian coordinate system 18. An example of the images detected by the velocity sensor 16 is illustrated in FIGS. 3D-3F. Each of the detectors 14, 16, however, may be any suitable detector and/or combination of detectors, capable of performing the necessary functions, such as, for example, detecting the light screen 12, (e.g., detection of visible and/or non-visible light detectors, etc.) or the detection of the velocity v of the subject 20.

In the example configuration, three-dimension data is acquired from the detectors 14, and the velocity sensor 16 using a time domain analysis as the subject 20 moves through the light screen 12. More particularly, the detectors 14 each acquire a two-dimensional image and the image coordinates are referred to as $(u_1, v_1)$ for the first of two detectors 14 and $(u_2, v_2)$ for the other one of the detectors 14. The two-dimensional images are transmitted to a processor 30. In some examples, the detector 14 may be adjusted so that only the portion of the light screen 12 on the subject 20, the "laser stripe" is detected (e.g., the intensity gain is adjusted) as illustrated in FIG. 3A-3C. Additionally, the velocity sensor 16 determines the instantaneous velocity (e.g., movement) by detecting the movement of the subject through the lights screen 12 as illustrated in FIGS. 3D-3F. The detected movement is similarly transmitted to the processor 30.

The processor 30, as described herein, receives the transmitted data and utilizes the data to create a three-dimensional image of the subject 20. The produced image of the subject 20 may be stored as data, displayed, modeled, assembled, and/or otherwise transformed or further processed as desired. In one example, the processor 30 renders the three-dimensional image on a display 32 (e.g., converts the image from a file into visual form). In other examples, the three-dimensional image may be stored on a computer readable medium and/or utilized for further processing including, for example, for biometric (e.g., facial) recognition.

As described, the example apparatus 10 includes two frontal detectors 14 that capture images of a laser stripe whose plane is not parallel to the optical axes of the detectors 14. In this example, one of the detectors 14 is offset from the plane perpendicular to the light screen 12 in a first direction, while the other of the detectors 14 may be offset from the plane perpendicular to the light screen 12 in a second direction opposite the first direction. Thus, each of the detectors 14 should be calibrated to convert detected image coordinates to the reference Cartesian coordinate system 18, by, for example, obtaining the affine transformation that relates the image plane coordinates $(x_i, y_i)$ of the detector 14 to the image plane of the Cartesian coordinate system 18.

In one example calibration, illustrated in FIGS. 4-6, each of the detectors 14 is calibrated independently and commonly referenced. In this example, a checkerboard-type grid 400 comprising one-inch-by-one-inch squares 410 is place in the detectors field of view coincident with the plane of the light screen 12. An image of the grid 400 is then acquired by each of the detectors 14 individually. An example image 500 captured by one of the detectors 14 is shown in FIG. 5, while an example image 600 after rectification is illustrated in FIG. 6. The affine distortion of the outer border of the checkerboard pattern of the grid 400 is modeled using linear fits to the boundaries of a large trapezoidal region 510 encompassing most of the squares 410 defined by the grid 400. A position at any point within the region 510 can be rectified by interpolating known values from the region corners. Thus, a measurement $(u_1, v_1)$ in the field of view of either of the detectors 14 maps via interpolation to stripe plane coordinates $(x_i, y_i)$.

The example calibration process accounts for perspective distortion by knowing the dimensions of the squares 410 of the grid 400. Least-squares fits are obtained for each boundary line using an automated process. The fit equations yield calibration equations (Equation 1, Equation 2) that serve to transform the image plane coordinates (x, y) into world coordinates (x', y').

$$y' = \frac{M}{y_2 - y_1}(y - y_1) \qquad \text{Equation 1}$$

$$x' = \frac{N}{x_2 - x_1}(x - x_1) \qquad \text{Equation 2}$$

where M is the height of each of the squares 410 in the grid 400, N is width of each of the squares 410 in the grid 400, and $x_1, x_2, y_1$, and $y_2$ are intercepts obtained from the linear fits.

After rectification, the images 600 obtained from each of the two detectors 14 are placed in the common Cartesian coordinate system 18, by obtaining a common origin. In this example, five markers 420 are statically located on the grid 400. The two-dimensional offset $(\Delta y_1, \Delta x_1)$ that coincides with each marker 420 is computed. In some instances, noise may be generated by a calibration marker 420 that is not exactly coincident with the plane of the laser screen 12, therefore, an object, such as a nonplanar sphere (not shown), may be used to validate the computed offsets, and the process may be repeated as necessary. Furthermore, any number of markers and/or identification means may be used.

As described herein, as part of the three-dimensional reconstruction, the apparatus 10 tracks the movement of the subject 20 as the subject walks through the light screen 12 via the velocity sensor 16. As noted above, in one example, the subject 20 is a human subject walking through the light screen 12. Accordingly, even under ideal movement scenarios, it is possible and likely that the subject 20 will not only move forward along the z-axis of the Cartesian coordinate system 18, but also will shift up and down along the y-axis and rotate slightly because of joint articulation through a rotation angle θ. Any suitable algorithm, such as for example the Iterative Closest Point (ICP) algorithm, may be used to find the changes in the y-axis, the z-axis, and the rotation angle θ from one frame to another.

In one example illustrated in FIGS. 7A-7F, the position of the face of the example subject 20 is found utilizing the ICP algorithm. For instance, an image 700 of the subject 20 is acquired with the velocity sensor 16 configured with a low gain setting (FIG. 7A). The background of the obtained image 700 is suppressed using a standard background subtraction technique to produce a second image 710 (FIG. 7B) and the image 710 is mapped to a y-z coordinate view within the Cartesian coordinate system 18 to produce an image 720 (FIG. 7C). Small difference pixels in the image 720 are then removed by standard thresholding techniques to produce an image 730 (FIG. 7D). The resultant image 730 is then morphologically closed to remove small gaps caused by the background elimination to produce am image 740 (FIG. 7E). Finally, any connected components in the image 740 containing fewer than 100 pixels are deleted, leaving just an image 750 of the face of the subject 20.

The ICP algorithm is sensitive to data outliers, which can exist in the captured image 750 due to unwanted noise. To reduce the impact of data outliers, in one example illustrated in FIG. 8A-8F, all data below a predetermined distance (e.g., 25.4 cm) below the top of the face region of the image 750 of the face of the subject 20 is deleted. In this instance, the top of the face region of the image 750 of the subject 20 is assumed to be the location of the highest white pixel. The farthest point 800 to the left in the largest remaining connected component is defined to be the nose tip of the subject (FIG. 8B) as illustrated by the line 810. The edge 820 of the profile containing the nose tip 800 is then extracted from the image 750 (FIG. 8C). The (z, y) coordinates of the edge 820 of the profiles are found for all images 750, and each edge 820 is centered at the origin. Then the ICP algorithm is run on successive pairs of profiles to output an angular rotation (Δθ) and a spatial translation (Δy, Δz) for the best alignment of the two outlines (m and d) based on root-mean-square registration error (Err) as expressed in Equation 3.

$$[\Delta\theta \Delta y \Delta z \text{Err}] = \text{ICP}(m,d) \quad \text{Equation 3}$$

To visualize this process, FIG. 8D shows an outline of a current frame 830 and previous frame 840. The outlines 830, 840 are cropped from the initial nose to discard pixels as shown in FIG. 8E. As image 850 showing the final alignment results after the ICP algorithm is shown in FIG. 8F.

The ICP algorithm is also sensitive to noise, and accordingly, bad alignments can occur. To minimize the chances of bad alignments, the ICP algorithm may be used multiple times for each pair of images, inverting the roles of the current and previous frames. For example, the ICP algorithm may be used to compute a transform for one of its input data sets to align it with the other, and is thus asymmetric in its treatment. The transform parameters Δθ, Δy, and Δz from these multiple runs may be averaged to yield a final transformation.

A cumulative sum of angle changes and translations provides the required information for the global alignment of all the face frames from the side camera. To account for noise, angle changes below a threshold ($T_\theta$) are discarded as are spatial translations less than half a pixel (e.g., in this example 0.06 cm). $T_\theta$ is defined as the rotation of the face outline required to produce a one pixel (e.g., 0.12 cm) change of location in the image, and is image-dependent.

Detection of the laser stripe 12 by the detectors 14 (as shown in the example of FIGS. 3A-3C) is accomplished by identifying pixels with maximal red color component of the RGB pixel. In one instance, the ambient lighting around the apparatus 10 was dimmed to improve the ability to detect the laser stripe 12. Additionally, because the example subject 20 is a human face, it is known that the diversity of color in a human face resides mostly in the red and green planes, and the blue plane value tends to be nearly constant due to the saturation setting of the detector 14. From the a priori knowledge of the face color, a grayscale image ($I_{gray}$) is formed from the RGB image I (Equation 4), a threshold ($T_{image}$) is derived from $I_{gray}$ (Equation 5), and pixels below $T_{image}$ are discarded (Equation 6). The example red laser line produced by the laser screen 12 tends to be intensified by this process and the background noise suppressed.

$$I_{gray} = I_{red} - I_{green} \quad \text{Equation 4}$$

$$T_{image} = 0.15 * \text{mean}(I_{gray}) \quad \text{Equation 5}$$

$$I_{new}(i,j) = I_{gray}(i,j) \cdot (I_{gray}(i,j) > T_{image}) \quad \text{Equation 6}$$

The center of the laser line in the image (the line's width is not constant due to the Gaussian profile of the stripe cross-section, whose spread increases with standoff) is determined using any suitable method, including, for example temporal domain processing. In this method, as a laser stripe passes over a given image pixel (u, v), the intensity I(u, v) can be assumed to sample a Gaussian curve 900 over time, as shown in FIG. 9. A subpixel estimate of a peak 910 of the Gaussian curve 900 is obtains utilizing a suitable method, including, for example, by calculating the time value, t, yielding the maximum intensity $t_{max}$, and computing the weighted sum of t values within 5 pixels of $t_{max}$. This yields a subpixel estimate $t_{peak}$ for which a $z_{peak}$ will be found for that time. This calculation is illustrated in Equation 7.

$$z_{peak} = \frac{\sum_{i=t_{max}-5}^{t_{max}+5} z(t_i) * I(u, v, t_i)}{\sum_{i=t_{max}-5}^{t_{max}+5} I(u, v, t_i)} \quad \text{Equation 7}$$

where I(u,v,$t_i$) is the intensity of the pixel at the (u, v) coordinate in the image at the time instance $t_i$.

Figure 10B:
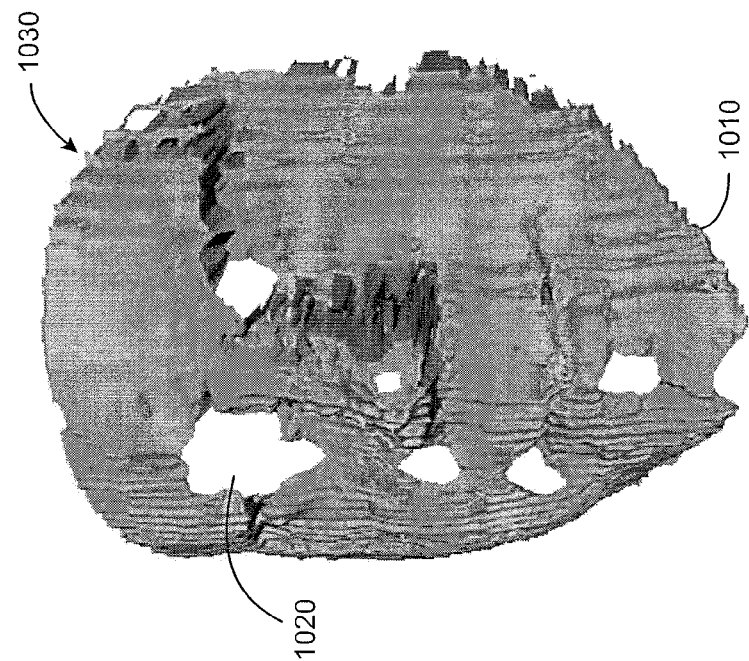
FIG. 10B is a cropped version of the example three-dimensional image of FIG. 10A.
Figure 10A:
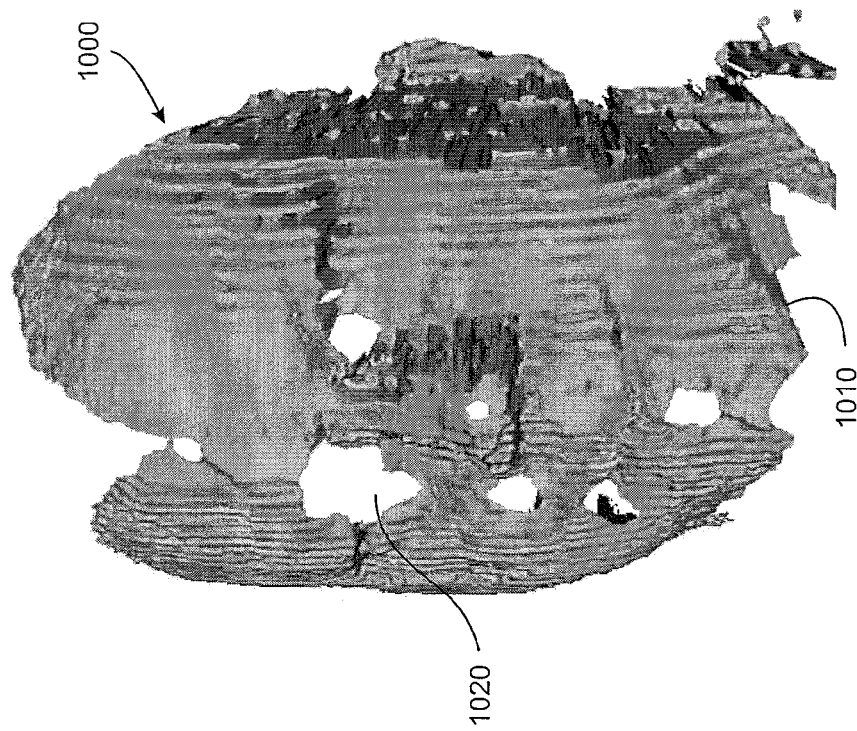
FIG. 10A is an example three-dimensional image produced by the example apparatus of FIG. 1.

After calibration and laser stripe detection, the sample apparatus 10, and more particularly, the processor 30 may be utilized to create a three-dimensional image of the subject 20. In particular, by transforming pixel coordinates to real coordinates within the Cartesian coordinate system 18 using the calibration data, real world three-dimensionality of the subject 20 may be produced by the processor 30 utilizing any suitable modeling method. For example, with the fused data from the detectors 14 using the calibration offset, a three-dimensional image 1000 may be created by making a mesh using triangulation, such as, for example Delaunay triangulation as illustrated in FIG. 10A. Specifically, in this example, a mesh surface 1010 is superimposed on the detected data. In this illustration, the largest triangle surfaces are discarded to illustrate the holes of the image. As can been seen, there may be a few large holes 1020, particularly by the nose on the cheek, below the nose, on the forehead, and on the chin. The holes 1020 may be attributed to concavities in the subject 20, e.g., the eye sockets, and/or regions of the subject 20 that are substantially parallel to the light screen 12, e.g. the middle of the forehead, the bridge of the nose, the tip of the nose, the chin, a small part of the cheeks near the nose, and the lips. Temporal processing alleviates this problem to some degree as these points do have at least part of the laser stripe passing over them.

Figure 11B:
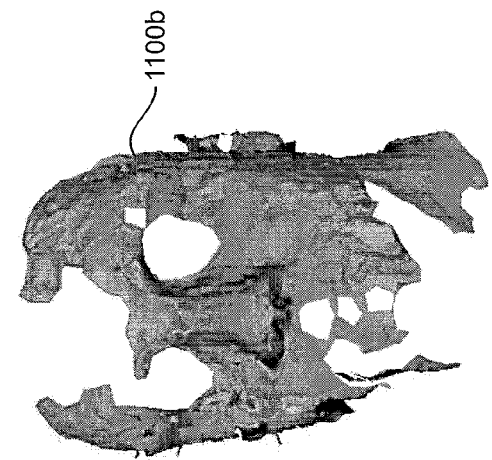
FIGS. 11A-11C are addition example three-dimensional images produced by the example apparatus of FIG. 1.
Figure 11C:
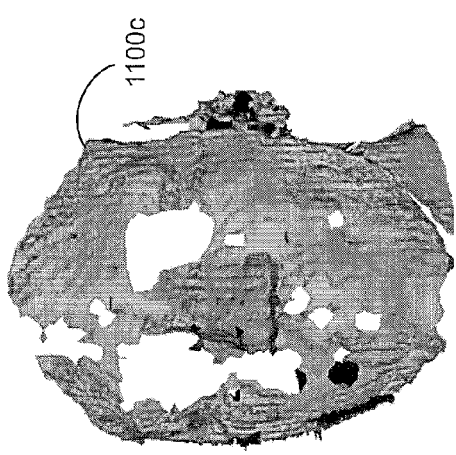
Figure 11A:
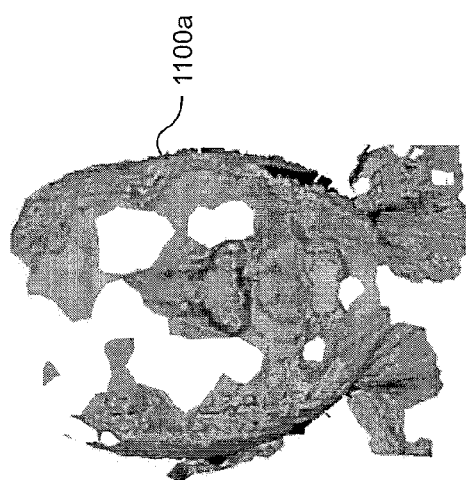

As described herein, in some instances, the produced image 1000 may be utilized for facial recognition. In practice, it has been found that many of the acquired three-dimensional points are not helpful for facial recognition such as parts of the neck, the shoulders, and the ears. Accordingly, in some instance, such as illustrated in FIG. 10B, these points were cropped using ground truth nose locations found by an operator manually examining each mesh, to produce a cropped image 1030. Once the nose was found, only the points within a threshold interval of Euclidean distance were kept. This process may be conducted manually and/or automatically, and may be varied as desired. Additional examples of faces 1100a, 1100b, 1100c imaged by the sample apparatus 10 are illustrated in FIGS. 11A, 11B, and 11C, respectively.

In the examples above, triangulation error may occur, wherein the error is a function of the cross-sectional thickness of the light screen 12, the speed of the subject 20, and the frame rate of the detector 14. In one example, the detector 14 captures one hundred frames per second (100 fps), but even at this frame rate, the subject 20 could travel through the light screen 12 too quickly. One way to reduce this error is to limit the speed by which the subject 20 passes through the light screen 12 giving a suitable number of frames, such as, for instance, between 30 and 60 frames for the face of the subject 20. Because it may not always be practical to limit the speed of the subject 20 through the light screen 12, it will be appreciated that detectors 14 with higher sensitivities (e.g., frame rates, etc) may be utilized to reduce any associated triangulation error.

Additionally, some subjects 20, and especially human subjects, can change their position and orientation as they intersect the light screen 12. For example, the subject 20 may stop, turn, move laterally, retreat, etc. This can be seen by the apparatus 10 as shifts along the x-axis, y-axis, and z-axis of the Cartesian coordinate system 18, as well as changes in the pitch, yaw, and roll of the subject 20. A shift along the z-axis happens in all cases because the subject 20 moves through the light screen 12. As described above, the velocity sensor 16 tracks the z-shift, the y-shift, and the pitch angle, $\theta$. By using the ICP algorithm with the output of the velocity sensor 16, changes in the pitch angle $\theta$ may be tracked.

In some instances, the changes in the pitch angle $\theta$ are not taken into account. However, in those instances, the pitch angle $\theta$ data may be obtained and may be integrated into the produced image as desired. Additionally, in some examples, an assumption may be made that the shift in the x-axis is minimal, there is zero yaw change, and/or zero roll change. These changes in the movement of the subject 20 can be tracked with a frontal detector in conjunction with a topside detector using the same technique as used for the velocity sensor 16.

Figure 12:
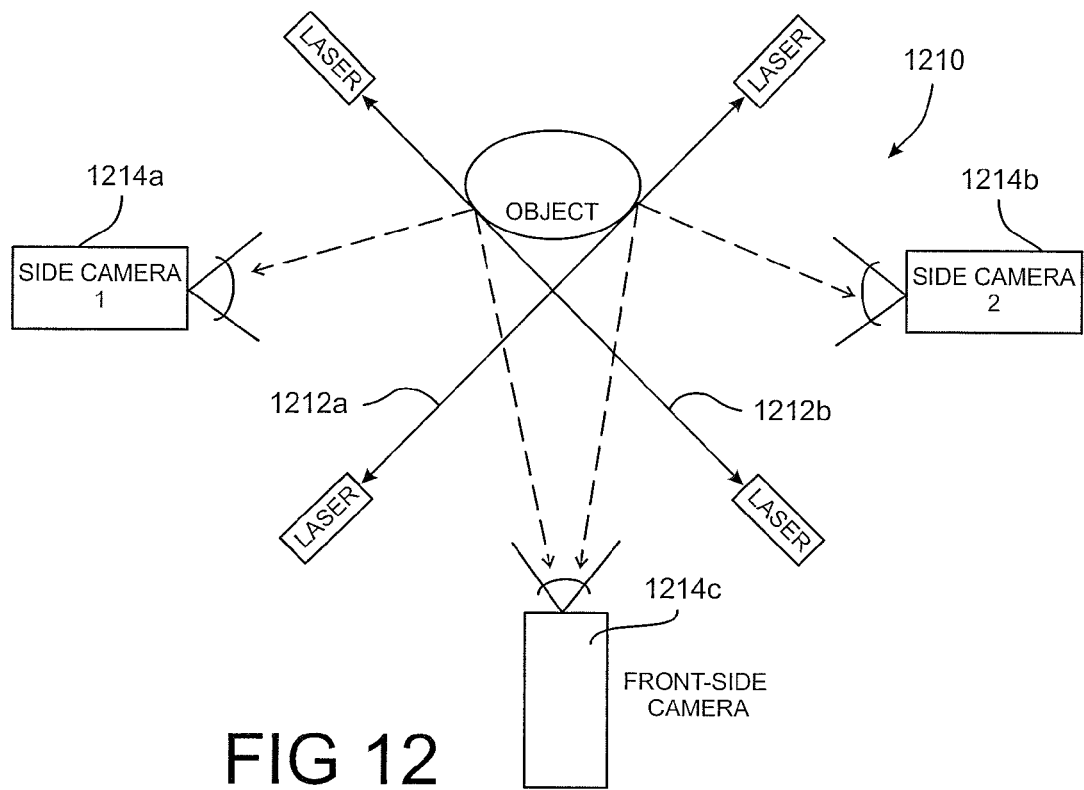
FIG. 12 is a schematic drawing of another example apparatus for three-dimensional imaging of a moving object.

Referring to FIG. 12, another example of an apparatus 1210 for imaging using a static light screen is illustrated. In particular, the example apparatus 1210 includes two light screens 1212a and 1212b, and three detectors 1214a, 1214b, 1214c. As the subject 20 moves through the light screens 1212a, 1212b, the subject 20 is imaged by each of the three detectors 1214a, 1214b, 1214c, which results in two three-dimensional images from each of the three detectors 1214a, 1214b, 1214c for a total of six three-dimensional images. The six images are then merged into one final three-dimensional image, utilizing any suitable merger method, including those described herein.

While the example apparatus 1210 may result in increased complexity, including, for example, in calibrating the three detectors 1214a, 1214b, 1214c, in determining the detectors' global positions, in processing the data, and in distinguishing between one light screen and the other, the benefit is added coverage of the subject 20. In particular, when the subject 20 is a human being, the apparatus 1210 may result in more complete coverage of the forehead, nose, and chin.

The example apparatus 1210 may also yield additional information valuable for certain types of biometrics as described below. For instance, assuming an ear of the subject 20 is visible, two-dimensional ear images and three-dimensional ear images may be available from each side of the subject 20 using the detectors 1214a, 1214b located on the sides of the subject 20. Two-dimensional profile images from each side of the face of the subject 20 may be acquired with the same detectors, and two-dimensional frontal images may be acquired from the detector 1214c, located at the front-side of the subject 20. For the three-dimensional images, two images of each ear can be acquired which may be helpful in multi-probe biometric matching and ear registration in two-dimensional ear images.

In the example where the apparatus 10, 1210 collect three-dimensional images of a human face, these images may be used for biometric matching (e.g., facial recognition) using any suitable biometric matching technique. On such approach for three-dimensional face matching is to calculate and tabulate an alignment error obtained using the ICP algorithm. In this approach, the ICP algorithm iteratively calculates the least squares fit of two three-dimensional images, and after each iteration, one of the images is translated and rotated such that the error for the least squares fit decreases. This process continues until the change in the least squares error between iterations is below a predefined tolerance level or a maximum number of iterations is exceeded. Smaller alignment error values indicate a closer match between the two images.

The example biometric matching techniques may be used to identify and/or verify a person's identity. Both tasks compare a scanned image to an existing database of gallery templates where the scanned images and gallery templates are both three-dimensional. An identification task compares the scanned image against every template in the gallery and returns the identity of the best match. A verification task compares the scanned image only against templates that match an identity claim that accompanies the scanned image.

Figure 13:
FIG. 13 is an example of two overlapping three-dimensional images produced by the example apparatus of FIG. 1 and used for facial recognition.

The example apparatus 10, 1210 may be used for both identification and verification purposes. In the examples described herein, however, the apparatus 10, 1210, utilizes the ICP algorithm to compute a match score in an identification experiment. For purposes of this experiment, the matching score is the alignment error. FIG. 13 illustrates the result of an ICP alignment of two images 1310, 1320 scanned by the by the apparatus 10 from the same subject 20. As shown, the two image 1310, 1320 align well with one another, indicating, the images 1310, 1320, are similarly constructed.

For purposes of biometric matching experimentation, a plurality of images for multiple subjects were compared to each other using ICP. In this example, the experiment took $O(ip^2n^2)$ where i is the number of iterations in ICP, p is the average number of points in each face, and n is the number of faces. In this experiment, to compare two faces using ICP took between one and two seconds. For a sample size of 354 faces, an all-vs-all experiment took between 34 and 68 hours. To scale the all-vs-all experiment, Condor, a distributed computing system was utilized. Specifically, Condor allows a user to submit jobs to a number of hosts for execution. With 300 hosts, a 354 face all-vs-all experiment took approximately 7 minutes once all the jobs were distributed. The hosts in Condor range from state-of-the-art to four-year-old computers.

Experiments were performed on three data sets acquired in two sessions detailed in Table I. Each subject 20 had between three and eight images with an average of four images. The first set of data, Set 1, was scanned by the apparatus 10 in March, 2008. The second set of data, Set 2, had the same images as Set 1 with the addition of 52 images taken in January 2008. The third set of data, Set 3, was data acquired by a MINOLTA® 910 three-dimensional scanner of the same subjects in Set 1 during the same acquisition. Each of the subjects 20 was asked to have a neutral expression.

TABLE I

| Data Sets | Sensor/Time of Acquisition | Number Of Images | Number of Unique Subjects | Average Resolution (# of Points) |
|---|---|---|---|---|
| Set 1 | March 2008 | 302 | 75 | 33000 |
| Set 2 | January and March 2008 | 354 | 81 | 38729 |
| Set 3 | Minolta March 2008 | 297 | 75 | 28000 |

Figure 14B:
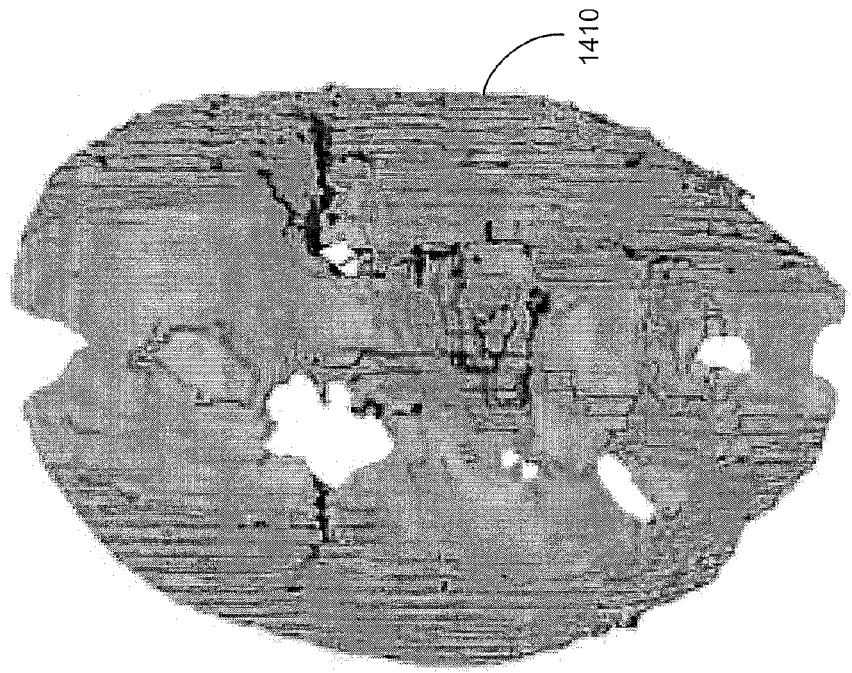
FIGS. 14A-14D illustrate example three-dimensional images produced by the example apparatus of FIG. 1, including various radius croppings and used for facial recognition.
Figure 14A:
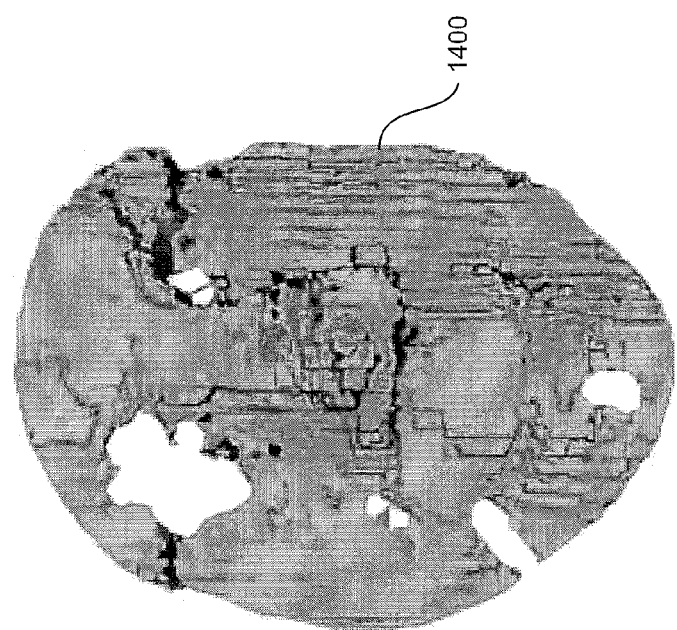
Figure 14D:
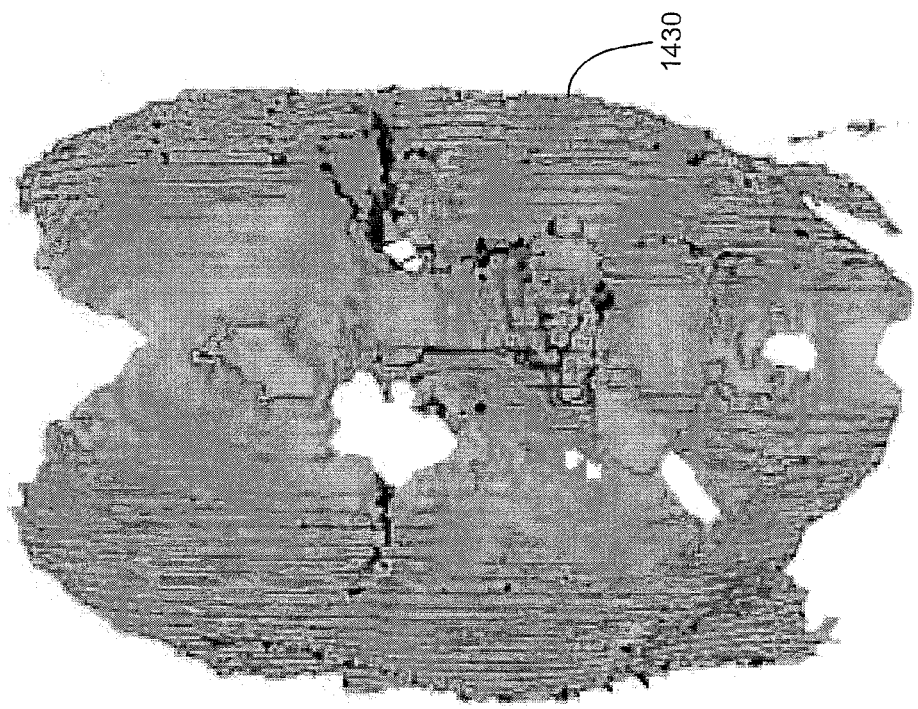
Figure 14C:
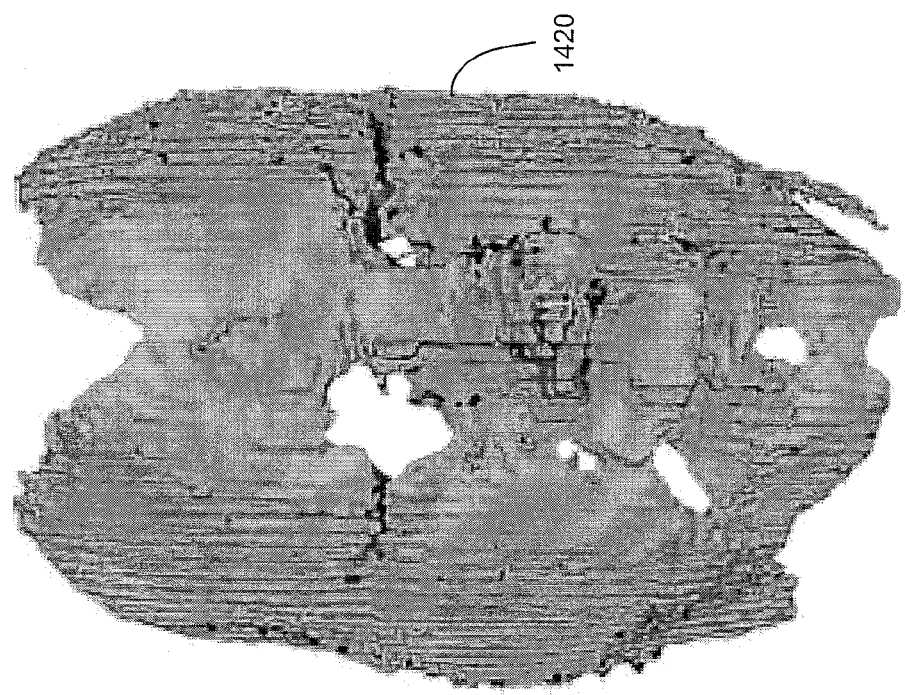

As described herein, each of the produced images were cropped and centered at the origin. In this example, the images were cropped based on the ground truth nose to a predetermined crop radius from the nose. The nose of each subject 20 was found manually; however, an automated nose finding, technique could be utilized as desired. The performance as a function of the cropping radius was also investigated. Specifically, the experiment evaluated a radius cut with a range of 5 cm to 15 cm in 1 cm increments for both probe and gallery images. Some examples of an image subject to various cropping radius are in FIG. 14. In particular, FIG. 14A shows a produced image 1400 with a 7 cm cropping radius, FIG. 14B shows a produced image 1410 with an 11 cm cropping radius, FIG. 14C shows a produced image 1420 with a 15 cm cropping radius, and FIG. 14D shows a produced image 1430 with a 20 cm cropping radius. In this experiment, the radius cut was selected to be 11 cm, and this cut was used for both the scanned image and gallery sets.

As noted above, to compare images to each other, the ICP algorithm was used to align two images and output an error value. The error value was identified as a matching score. The ICP algorithm employs two geometric sets: a fixed model shape and a data shape that is moved and oriented to minimize the alignment error. In our application, both the scanned image and the gallery image were utilized as the model shape.

In the resultant data, matching score 1 ("Method 1") is the smaller of the two matching errors obtained, and matching score 2 ("Method 2") is their product. Matching score 2 decreases the error values for true positives with respect to the error values for false positives. The data supports that the use of Method 1 and Method 2 improves rank one recognition over using only one of the two matching alignments, and illustrates that Method 2 alone performs better than Method 1 alone.

It was observed that the error values are not normalized along the range of the possible alignment errors for a gallery image. Additional, normalization improves recognition results. Therefore, to normalize the data, $Err_{pg}$ (Equation 8) was normalized by the mean of all $Err_{jk}$ (Equation 9) as shown in (Equation 10). This increases error values above the mean and decreases error values below the mean, and results in the mean value for all the galleries compared to one another is equal to one.

$$[\Delta\theta\Delta\lambda\Delta\varsigma\Delta x\Delta y\Delta z Err_{pk}] = ICP(P, G_k) \quad \text{Equation 8}$$

where P is a scanned (probe) image, and G is a gallery image. P is best matched to G when applying $\Delta\theta$ $\Delta\lambda$ $\Delta\varsigma$ angle rotations and $\Delta x$ $\Delta y$ $\Delta z$ translational shifts to G.

$$[\Delta\theta\Delta\lambda\Delta\varsigma\Delta x\Delta y\Delta z Err_{jk}] = ICP(G_j, G_k) \quad \text{Equation 9}$$

where $G_j$ is the $j^{th}$ gallery image, and $G_k$ is a gallery image.

$$Err_{pkn} = \frac{Err_{pk}}{\sum_{j=1}^{L} \frac{Err_{pk}}{L}} \quad \text{Equation 10}$$

where L is the total number of images in the gallery, n is for the normalized value, and p is the error for the probe.

Due to the difference in resolution between the January 2008 images the March 2008 images, results for both data sets are both significant. The recognition results decreased between the Set 1 and Set 2 because the January 2008 acquisition was the first full scale data set acquired using the apparatus 10, and as such, there were some operator errors.

Referring to Table II, the recognition results are for two types of experiments: one gallery image per subject (1 G/s) and two gallery images per subject (2 G/s). The results from the experiment are given as root mean square ("RMS") errors between the scanned image and the gallery image, and these error results are to be refereed to as the raw results because these values have not been treated with Method 1 or Method 2, and they have not been normalized.

Normalization was found to improve our recognition results as well as Method 1 and Method 2 as reported in Table II. The addition of the January 2008 acquisition to the March 2008 data forming data Set 2 results in a decrease in the maximum rank one recognition rate, which we have determined is due to a change in resolution.

TABLE II

THE BEST RANK-ONE RECOGNITION ACROSS ALL SETS AND METHODS

| Set 1 | Without Normalization | With Normalization | Set 2 | Without Normalization | With Normalization |
|---|---|---|---|---|---|
| Raw Err 1 G/S | 63.2% | 73.7% | Raw Err 1 G/S | 54.2% | 66.7% |
| Raw Err 2 G/S | 77.9% | 87.7% | Raw Err 2 G/S | 69.8% | 78.6% |
| Method 1 1 G/S | 62.3% | 70.6% | Method 1 1 G/S | 54.2% | 64.8% |
| Method 1 2 G/S | 77.9% | 83.1% | Method 1 2 G/S | 69.3% | 75.5% |
| Method 2 1 G/S | 74.6% | 77.6% | Method 2 1 G/S | 68.1% | 71.1% |
| Method 2 2 G/S | 83.8% | 89.6% | Method 2 2 G/S | 74.0% | 78.1% |

In another example, the apparatus 10, 1210 may capture height information regarding the subject 20, which allows for a soft biometric to help in recognition. For example, any of the detectors 14, and/or the velocity sensor 16 can be utilized to determine a range corresponding to the height of the subject by converting the captured image into a fixed coordinate system, such as, for instance, the Cartesian coordinate system 18. Accordingly, the determined height interval may be used to narrow the potential biometric matches, when height data is available. In one experiment, the height interval was utilized as a soft biometric where an image was only compared to images of subjects whose height was within an interval. It was found for the normalized results of Method 2 were improved to 91.6% as compared to 89.6%.

In yet another example, the apparatus 10, 1210 may include an addition biometric detector(s) to improve recognition, such as, for example, an iris scanner. One example scanner is the IRIS ON THE MOVE® (IOM) iris scanner. The iris biometric data may similarly be combined with the produced three-dimensional image to narrow the potential biometric matches, when iris data is available.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

We claim:

1. A three-dimensional imaging apparatus comprising:
    at least one planar light screen;
    at least one projection detector having a detection axis offset from at the least one planar light screen, the at least one projection detector optically adapted to detect the instantaneous projection of the at least one planar light screen, and to output projection data;
    at least one relative motion detector having a detection axis offset from the plane of motion, the relative motion detector adapted to detect motion in at least two axes, and further adapted to output relative motion data;
    a processor adapted to acquire at least the projection data and the relative motion data;
    wherein the processor is further adapted to use an object tracking algorithm to determine the instantaneous velocity from the relative motion data to generate three-dimensional image data.

2. A three-dimensional imaging apparatus as defined in claim 1, wherein the at least one relative motion detector is a camera.

3. A three-dimensional imaging apparatus as defined in claim 1, wherein the at least one projection detector is a camera.

4. A three-dimensional imaging apparatus as defined in claim 1, wherein the processor utilizes triangulation to produce the three-dimensional image data.

5. A three-dimensional imaging apparatus as defined in claim 1, wherein a Cartesian coordinate system is referenced coplanar to the at least one planar light screen, and wherein at least one projection detector is calibrated to convert the output data to the Cartesian coordinate system.

6. A three-dimensional imaging apparatus as defined in claim 1, wherein the at least one relative motion detector is a plurality of relative motion detectors, collectively adapted to detect rotation about at least one axis.

7. A three-dimensional imaging apparatus as defined in claim 1, including a second planar light screen, wherein the second planar light screen is substantially perpendicular to the first planar light screen.

8. A three-dimensional imaging apparatus as defined in claim 1, including a second planar light screen.

9. A three-dimensional imaging apparatus as defined in claim 1, further comprising a height detector adapted to detect a height of the object proximate the first planar light screen, and adapted to output height data corresponding to the detected height.

10. A three-dimensional imaging apparatus as defined in claim 1, wherein the processor is further adapted to biometrically match at least a portion of the generated three dimensional image data with at least a portion of at least one three-dimensional image.

11. A three-dimensional imaging apparatus as defined in claim 10, wherein the three dimensional image is a face.

12. A three-dimensional imaging apparatus as defined in claim 1, further comprising a supplemental biometric detector adapted to detect at least one biometric characteristic.

13. A three-dimensional imaging apparatus as defined in claim 12, wherein the supplemental biometric detector is an iris detector, a two dimensional face detector, a two dimensional ear detector, or a three dimensional ear detector.

14. A three-dimensional imaging apparatus as defined in claim 10, wherein the processor utilized triangulation to create the three-dimensional image data.

15. A three-dimensional imaging apparatus as defined in claim 1, wherein the processor renders the three-dimensional image data to a display.

16. A three-dimensional imaging apparatus as defined in claim 1, wherein the first detector is offset from the plane perpendicular to the first planar light screen in a first direction, and wherein a second detector is offset from the plane perpendicular to the first planar light screen in a second direction, different from the first direction.

17. A method of generating a three-dimensional image of an object comprising:
    creating at least one planar light screen;
    detecting the projection of the at least one planar light screen upon the object;
    outputting data corresponding to the detected projection from the at least one planar light screen;
    determining the velocity along at least two axes of the object relative to the light screen using an object tracking algorithm;
    creating at least one three-dimensional image data output by combining at least the velocity with data from at least one planar light screen.

18. The method of generating a three-dimensional image of an object as defined in claim 17, wherein at least a portion of the generated three dimensional image data is compared with at least a portion of at least a second three-dimensional image.

19. The method of generating a three-dimensional image of an object as defined in claim 18, wherein the three dimensional image is a face.

20. The method of generating a three-dimensional image of an object as defined in claim 17, further comprising rendering the three-dimensional image data to a display.

* * * * *